United States Patent
Baatout et al.

(10) Patent No.: US 11,803,434 B1
(45) Date of Patent: Oct. 31, 2023

(54) WEBSITE ERROR DETECTION

(71) Applicant: Content Square SAS, Paris (FR)

(72) Inventors: Mohamed-Amine Baatout, Paris (FR); Corentin Flacher, Paris (FR); Karin Gamus, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/083,746

(22) Filed: Dec. 19, 2022

(51) Int. Cl.
*G06F 11/00* (2006.01)
*G06F 11/07* (2006.01)

(52) U.S. Cl.
CPC ...... *G06F 11/0754* (2013.01); *G06F 11/0709* (2013.01)

(58) Field of Classification Search
CPC ............. G06F 11/0754; G06F 11/3438; G06F 11/3447; G06F 11/3452; G06F 17/15; G06F 17/18; G06F 11/079
See application file for complete search history.

(56) References Cited

U.S. PATENT DOCUMENTS

| | | | |
|---|---|---|---|
| 11,467,943 B2 * | 10/2022 | Gueta | G06Q 30/0641 |
| 2019/0260818 A1 * | 8/2019 | Ciabarra, Jr. | G06F 11/36 |
| 2022/0245013 A1 * | 8/2022 | Ciabarra, Jr. | G06F 11/302 |
| 2022/0353345 A1 * | 11/2022 | Dille | H04L 67/02 |

* cited by examiner

*Primary Examiner* — Marc Duncan
(74) *Attorney, Agent, or Firm* — Schwegman Lundberg & Woessner, P.A.

(57) ABSTRACT

Systems and techniques may be used website error detection. An example technique may include identifying an error corresponding to a website, retrieving a first set of user sessions where the error occurred and a second set of user sessions where the error did not occur, and determining, for an access category, whether members of a set of values of the access category are correlated to the error, using the first set of user sessions and the second set of user sessions. The example technique may include comparing a characteristic of at least one member of the set of values that was determined to be correlated to the error to a threshold. The example technique may include displaying an indication of the error and an indication of the at least one member of the set of values.

18 Claims, 10 Drawing Sheets

ERROR METRICS — 902

| IDENTIFIER | ERROR LEVEL URL | SESSIONS WITH ERROR | ACCESS CONTROL ERROR VALUES |
|---|---|---|---|
| 0 | WWW.URL.COM/PAGE1 | 13 | DEVICE: DESKTOP |
| 1 | WWW.URL.COM/PAGE2 | 101 | DEVICE: UNKNOWN |
| 2 | WWW.URL.COM/PAGE1/SUB2 | 567 | DEVICE: DESKTOP \| OS: MAC OS X \| WINDOWS |
| 3 | WWW.URL.COM/PAGE3 | 212 | OS: MAC OS X |
| 4 | WWW.URL.COM/PAGE1 | 612 | SOURCE: DIRECT URL |
| 5 | WWW.URL.COM/PAGE4/SUB1 | 23 | NEW/RETURN: LOGGED IN |
| 6 | WWW.URL.COM/PAGE4 | 127 | BROWSER: FIREFOX |
| 7 | WWW.URL.COM/PAGE1/SUB1 | 312 | LANGUAGE: SPANISH |
| 8 | WWW.URL.COM/PAGE1/SUB3 | 381 | COUNTRY: FRANCE |
| 9 | WWW.URL.COM/PAGE5 | 36 | DEVICE: MOBILE \| SOURCE: SEARCH \| OS: WINDOWS |
| 10 | WWW.URL.COM/PAGE6 | 27 | |
| 11 | WWW.URL.COM/PAGE7 | 109 | |

FIG. 9

WEBSITE ERROR DETECTION

BACKGROUND

Web commerce has become a nearly universal way to sell products. Managing web commerce websites is often done by a team of people, who use web analytics to make design, structural, and interactive choices for the web commerce websites. Sales data from a website may be used to determine whether a product is successful. However, the sales data does not tell the entire story, nor does it provide sufficient data to make proactive decisions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIGS. 9-10 are example user interfaces for displaying website errors according to access categories, in accordance with some examples.

DETAILED DESCRIPTION

Occasionally, errors occur on a website. In order to determine a root cause of the error, developers may attempt to recreate the error or observer data related to the error (e.g., which users experienced the error). However, these details may be difficult to recreate or understand. Simply relying on user states where the error occurred may not give sufficient information to understand the error. For example, if an error occurs 90% of the time when the user is logged in, on the surface that suggests that the issue is a logged-in user issue. However, if 95% of website visits are by users who are logged in, then the error actually is occurring less frequently for logged in users in this example, per capita.

The systems and techniques described herein provide a technical solution to the problem of user state analysis for website errors. These systems and techniques compare a characteristic of a value of an access category (e.g., a user device attribute such as device type, an access attribute such as login status or browser, etc.) to a threshold to determine whether the value is correlated with the error. The complex analysis of the present systems and techniques may be used to determine which access category, and which value within the access category, may be relevant to the error.

Networked Computing Environment

Figure 1:
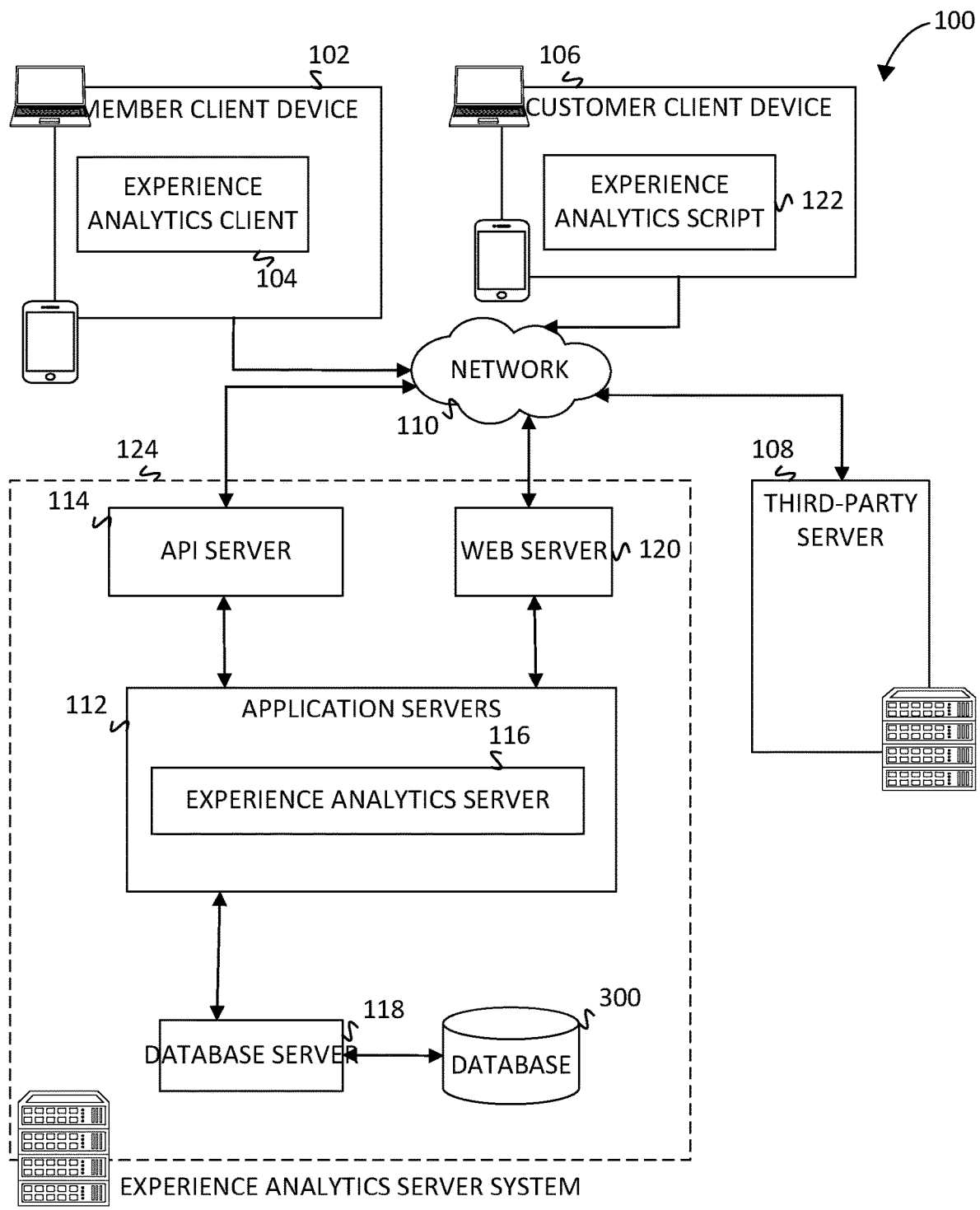
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, feedback provided by the user into feedback forms or widgets on the website, etc. Other processor and memory intensive processing of data may also be performed server-side by the experience analytics server 116, in view of the hardware requirements for such processing.

System Architecture

Figure 2:
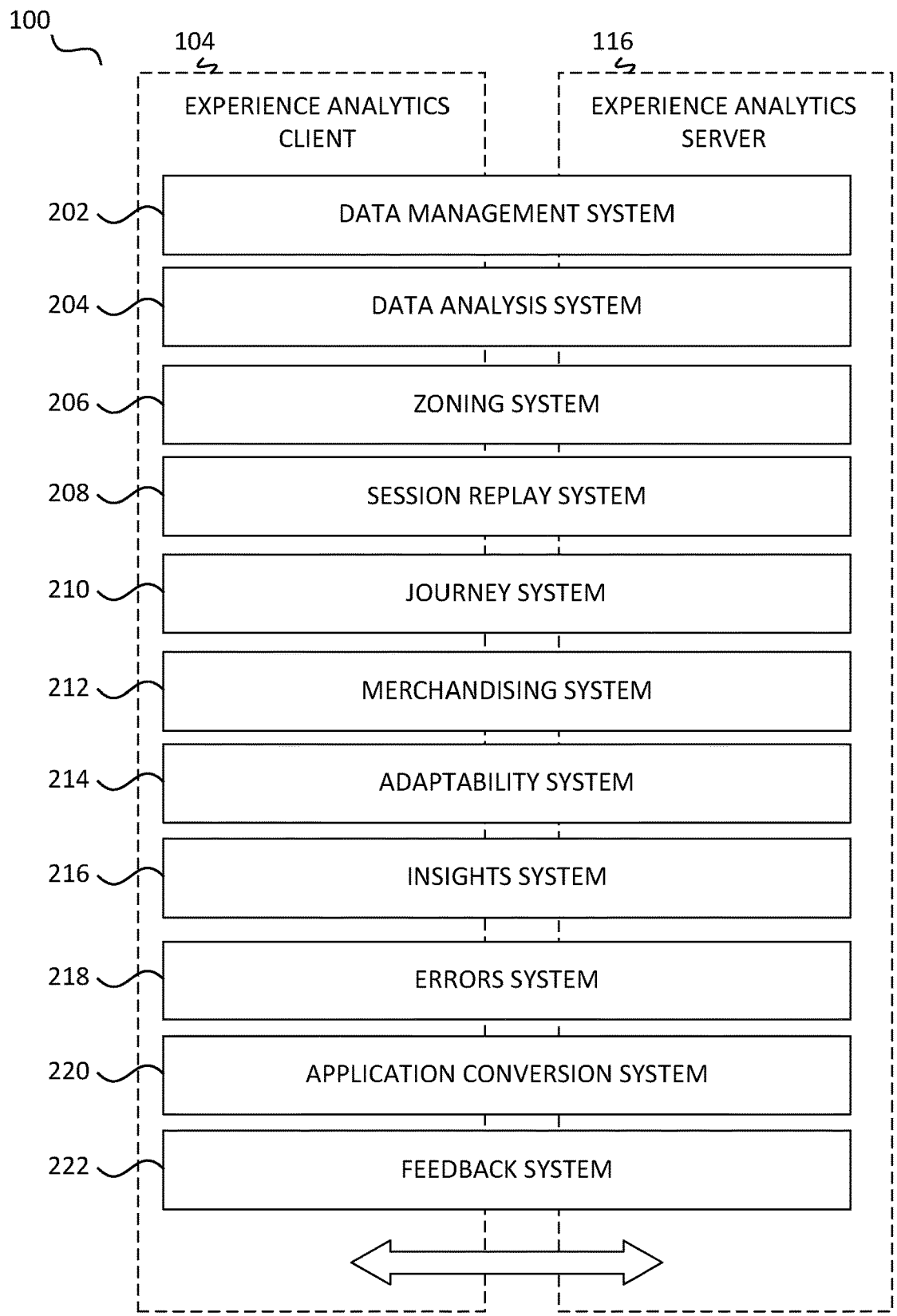
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for visitors that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

The feedback system 222 is responsible for receiving and analyzing data from the data management system 202 that includes the feedback data received from the client devices. As the visitor progresses through a client's website on the client device, a feedback webpage of the website, a pop-up window or tab, or an overlay can be displayed to receive the visitor's feedback. For instance, a feedback form can be displayed in a pop-up window or tab of the website, an overlay of the website, one of the plurality of webpages of the website, etc. The visitor can provide feedback on, for example, the functionality of the website, aesthetics of the website, on the goods and services associated with the website, etc. The feedback data can include a text input that is included into a feedback form on the website. The feedback data can also include a survey response, a rating that includes an image, an emoticon, or an icon, a screenshot of one of the plurality of webpages, etc. The feedback system 222 is also responsible for generating feedback interfaces to be displayed by the member client device 102 via the experience analytics client 104.

The errors system 218 may be used to collect data related to user access of a website where errors occur (and where errors do not occur). The errors system 218 may analyze the error data to determine a relevant value of an access category that is related to an error, as described below. The errors system 218 may provide an indication of the error, an indication of the relevant value or the access category, a graph showing an error related value breakdown, or the like.

Data Architecture

Figure 3:
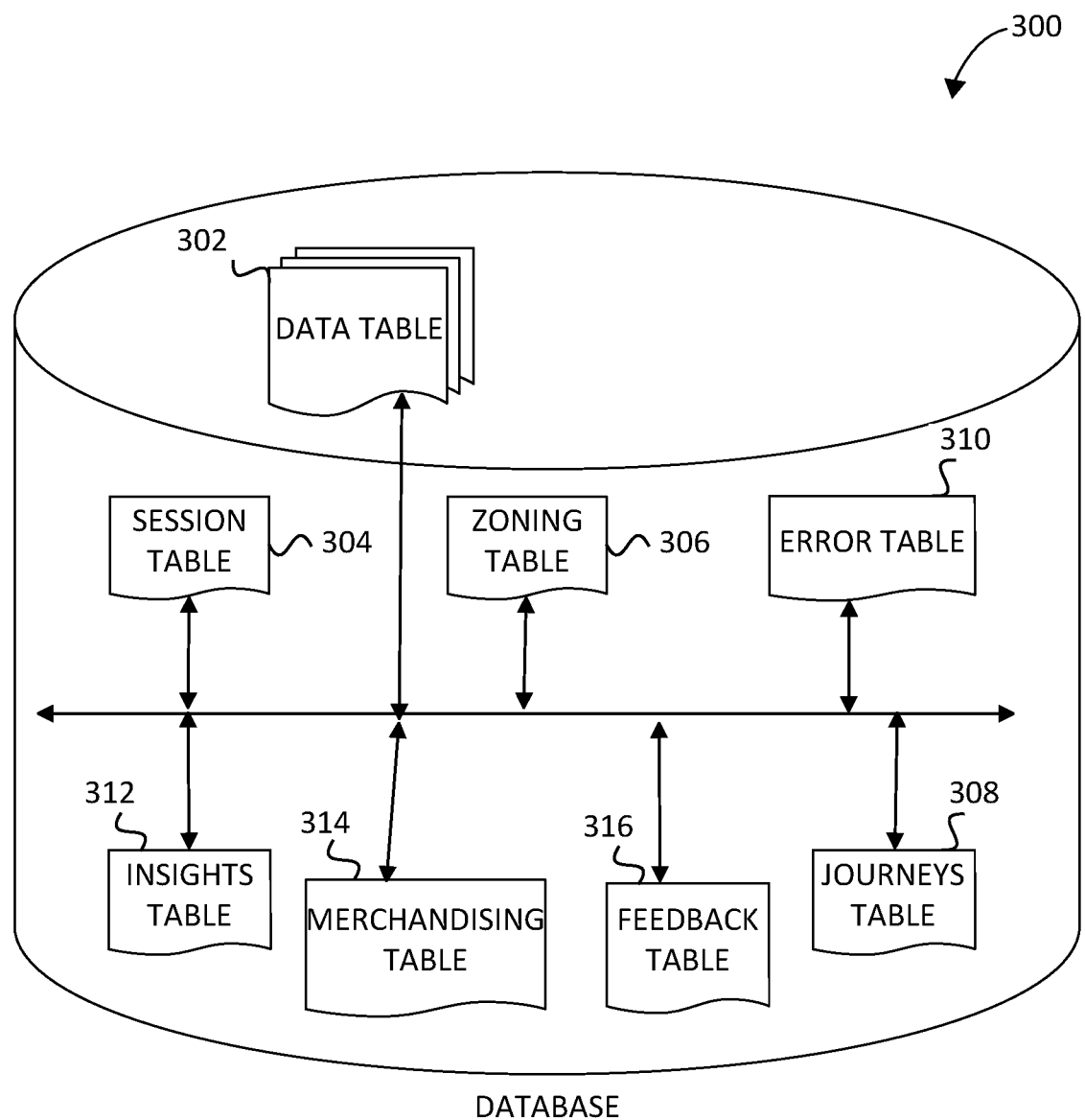
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

The feedback table 316 stores data associated with the feedback system 222. For example, the data in the feedback table 316 can include the feedback data received from each of the customer client devices 106 and stored in association with the customer client device 106 and the website associated with the customer client device 106. The feedback data can include, for example, the text input that provides the visitor's (or customer's) feedback on the website, survey response, rating that includes an image, an emoticon, or an icon, a screenshot of one of the plurality of webpages, etc.

The error table 310 may store access category information (e.g., values of access categories) for users accessing a website. The access category information may be stored along with a value of whether a particular error occurred, in some examples. The error table 310 may be used to retrieve user session information where an error occurred or did not occur. For example, a first set of user sessions may be retrieved where the error occurred, and a second set of user sessions may be retrieved where the error did not occur. The error table 310 may be accessed to store access category information (e.g., values) for the first or second set of user sessions.

Technique for Website Change Detection

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of operations in other methods, and may be performed by any number of different systems, such as the systems described herein, or any portion thereof, such as a processor included in any of the systems.

Figure 4:
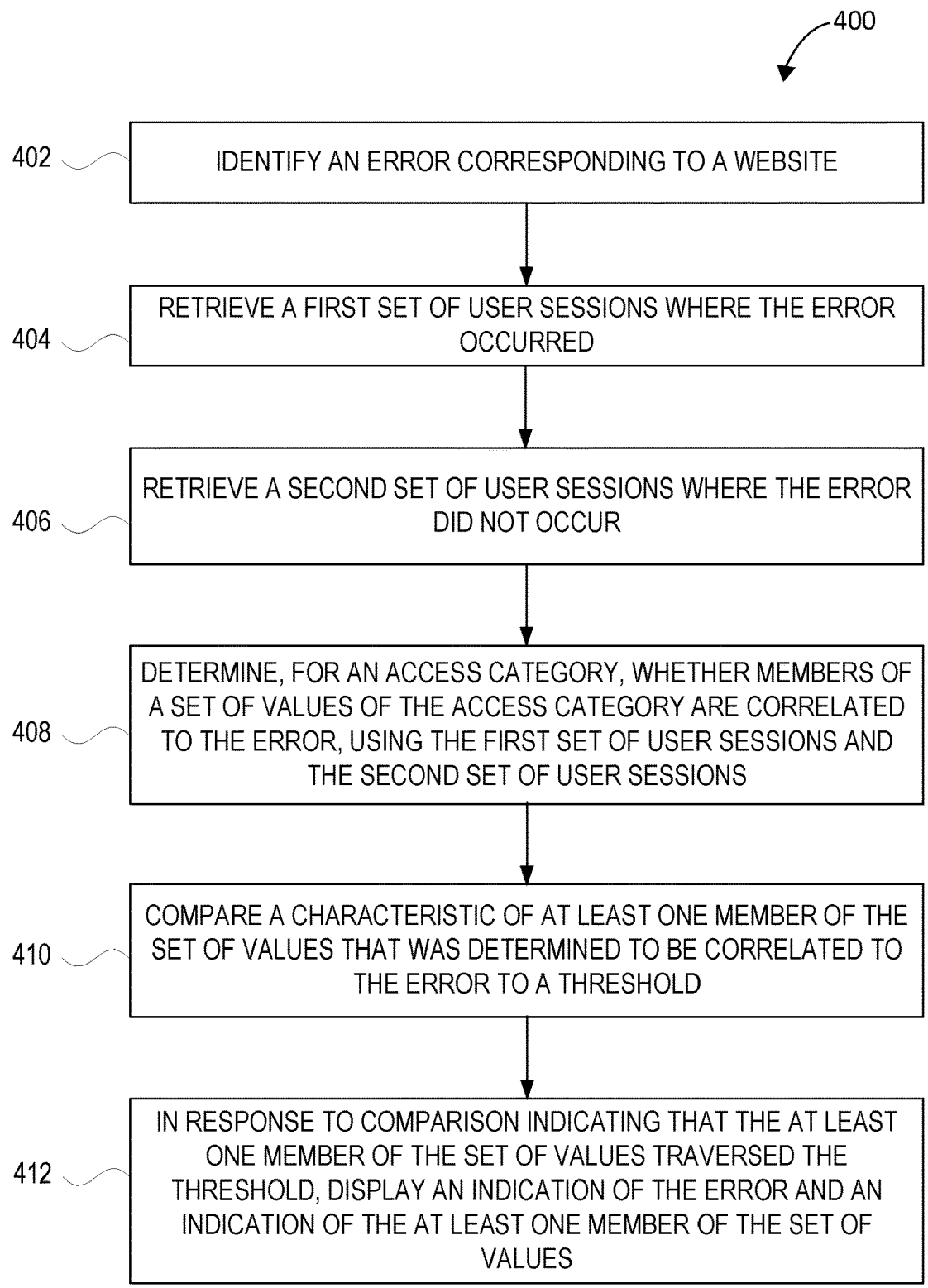
FIG. 4 illustrates a technique 400, in accordance with some examples.

FIG. 4 illustrates a technique 400 in accordance with an example. The technique 400 includes an operation 402 to identify an error corresponding to a website.

The technique 400 includes an operation 404 to retrieve a first set of user sessions where the error occurred. The technique 400 includes an operation 406 to retrieve a second set of user sessions where the error did not occur. In some examples, operations 404 and 406 may be performed together in some aspect, such as by retrieving a set of user sessions and then dividing the set of user sessions into the first set and the second set.

The technique 400 includes an operation 408 to determine, for an access category, whether members of a set of values of the access category are correlated to the error, using the first set of user sessions and the second set of user sessions. The access category may include at least one of a device type, a browser type, an operating system, a traffic source, a new or returning user status, an access language, a country location, or the like. Each of these access types may include its own set of values, which in some cases may include an unknown or indeterminate value.

For example, a device type may include one or more of desktop computer, laptop computer, tablet, mobile phone, internet of things (IoT) device (e.g., a smartwatch), etc. A browser type may include one or more of Firefox (provided by Mozilla), Safari (provided by Apple), Chrome (provided by Google), Opera (provided by Opera), Edge or Internet Explorer (both operated by Microsoft), or the like. An operating system may include one or more of Windows (provided by Microsoft), macOS (provided by Apple), Linux (open source), iOS (provided by Apple), Android (provided by various, including open source and Google), or the like. A traffic source may include one or more of direct access of the website (e.g., by entering, typing, copy/pasting, etc. a URL for the website into a browser), clicking from a link (e.g., an affiliate link, a search result link, an advertisement link, etc.), a redirect from another source, or the like. A new or returning user status may include one or more of a logged in user, a user with cookies or other tracking information stored from a previous visit to a website, a user not logged in, a user that has no record of having accessed the web site (e.g., no cookie stored), or the like. An access language may include one or more of any language spoken or written. A country location may include one or more of any country, nation, state, locality, province, or the like of the world, or may include an international or non-country specific value.

The technique 400 includes an operation 410 to compare a characteristic of at least one member of the set of values that was determined to be correlated to the error to a threshold. In an example, the characteristic may correspond to a difference of proportion between sessions in the first set of user sessions with the at least one member of the set of values and sessions in the second set of user sessions with the at least one member of the set of values. In another example, the characteristic may correspond to a difference of proportion between sessions in the first set of user sessions for any respective member of the set of values and sessions in the second set of user sessions with the respective member of the set of values. The comparison of operation 410 may include using a chi squared analysis, using residuals of the set of values, or the like.

The technique 400 includes an operation 412 to in response to comparison indicating that the at least one member of the set of values traversed the threshold, display an indication of the error and an indication of the at least one member of the set of values. The threshold may include one or more of a set of thresholds. In this example, displaying the indication of the at least one member of the set of values may include comparing one or more characteristics including the characteristic of the at least one member of the set of values to one or more of the thresholds of the set of thresholds, such as each threshold of the set of thresholds.

In some examples, operation 408 may include determining whether members of a second set of values of a second access category is correlated to the error. In these examples, operation 410 may include comparing a second characteristic of a second member of the second set of values that was determined to be correlated to the error to the threshold. Operation 410 in these examples, may include displaying the indication of the second member of the second set of values. The technique 400 may include an operation to display a graph of all correlated members that traversed the threshold.

Machine Architecture

Figure 5:
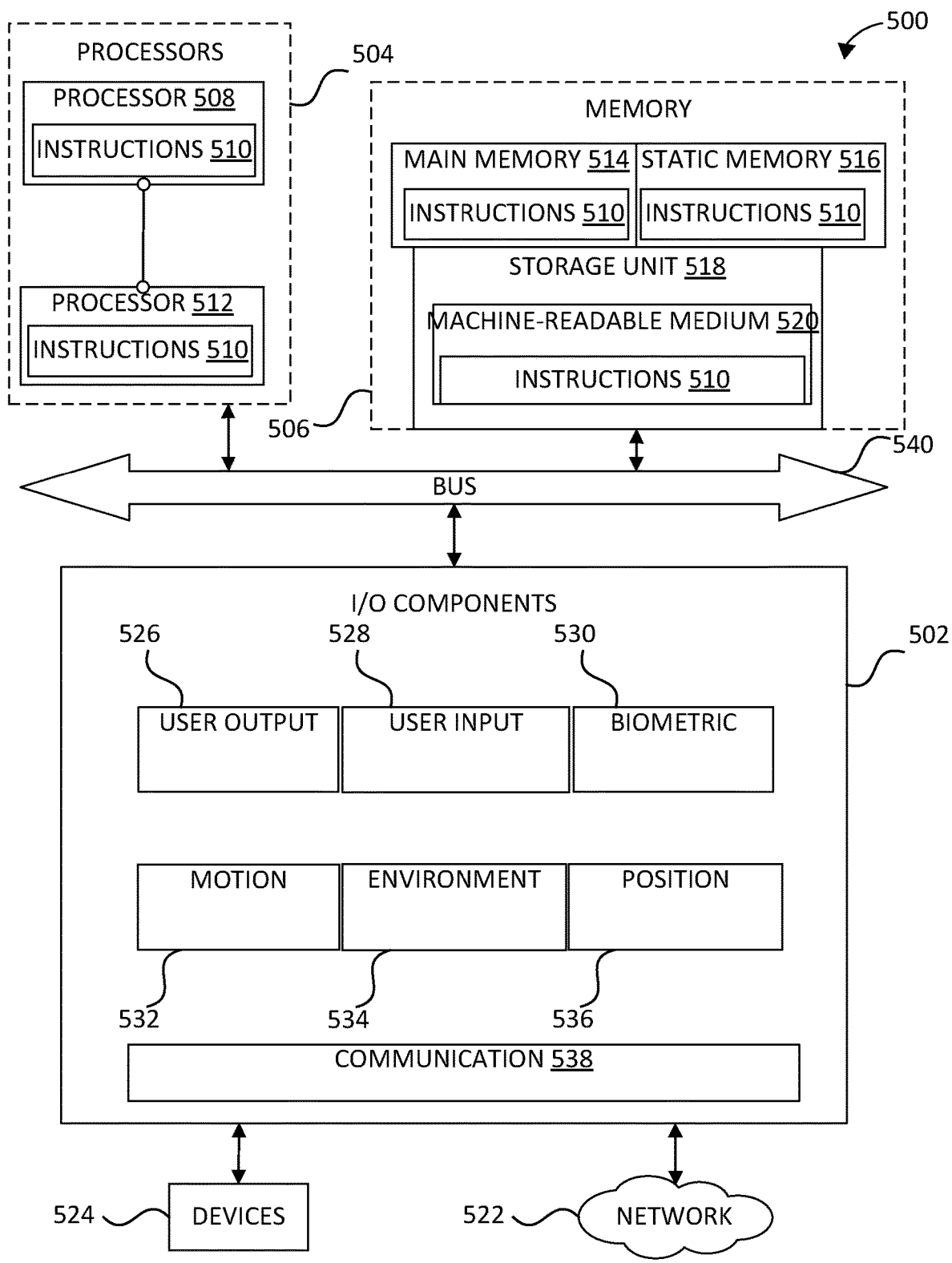
FIG. 5 is a diagrammatic representation of a machine in the form of a computer system within which a set of instructions may be executed for causing the machine to perform any one or more of the methodologies discussed herein, in accordance with some examples.

FIG. 5 is a diagrammatic representation of the machine 500 within which instructions 510 (e.g., software, a program, an application, an applet, an application, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may comprise the member client device 102 or any one of a number of server devices forming part of the experience analytics server 116. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 506, the static memory 516, and storage unit 518 store the instructions 510 embodying any one or more of the methodologies or functions described herein. The instructions 510 may also reside, completely or partially, within the main memory 514, within the static memory 516, within machine-readable medium 520 within the storage unit 518, within at least one of the processors 504 (e.g., within the processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Software Architecture

Figure 6:
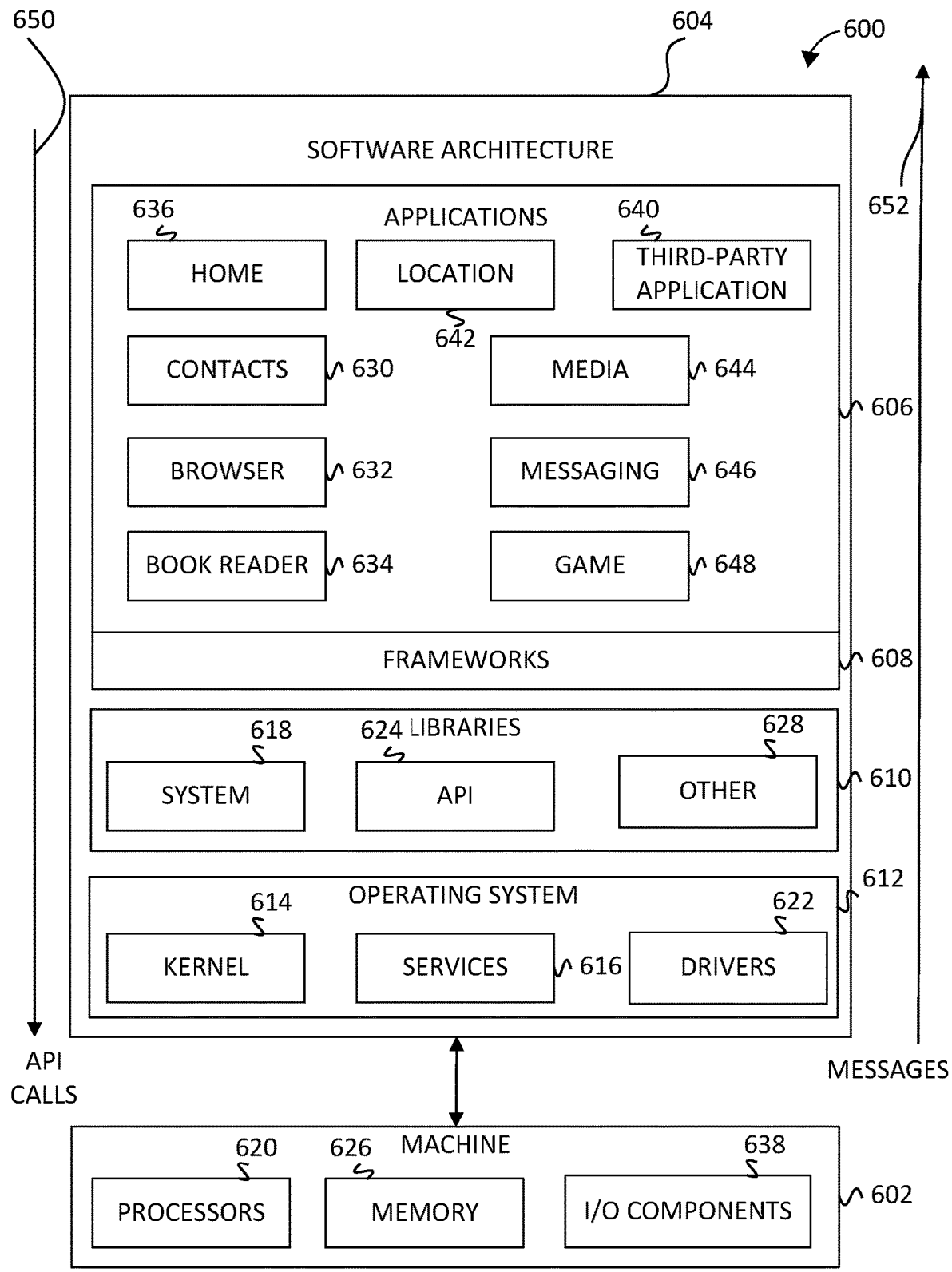
FIG. 6 is a block diagram showing a software architecture within which examples may be implemented, in accordance with some examples.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

Block Diagrams

Figure 7:
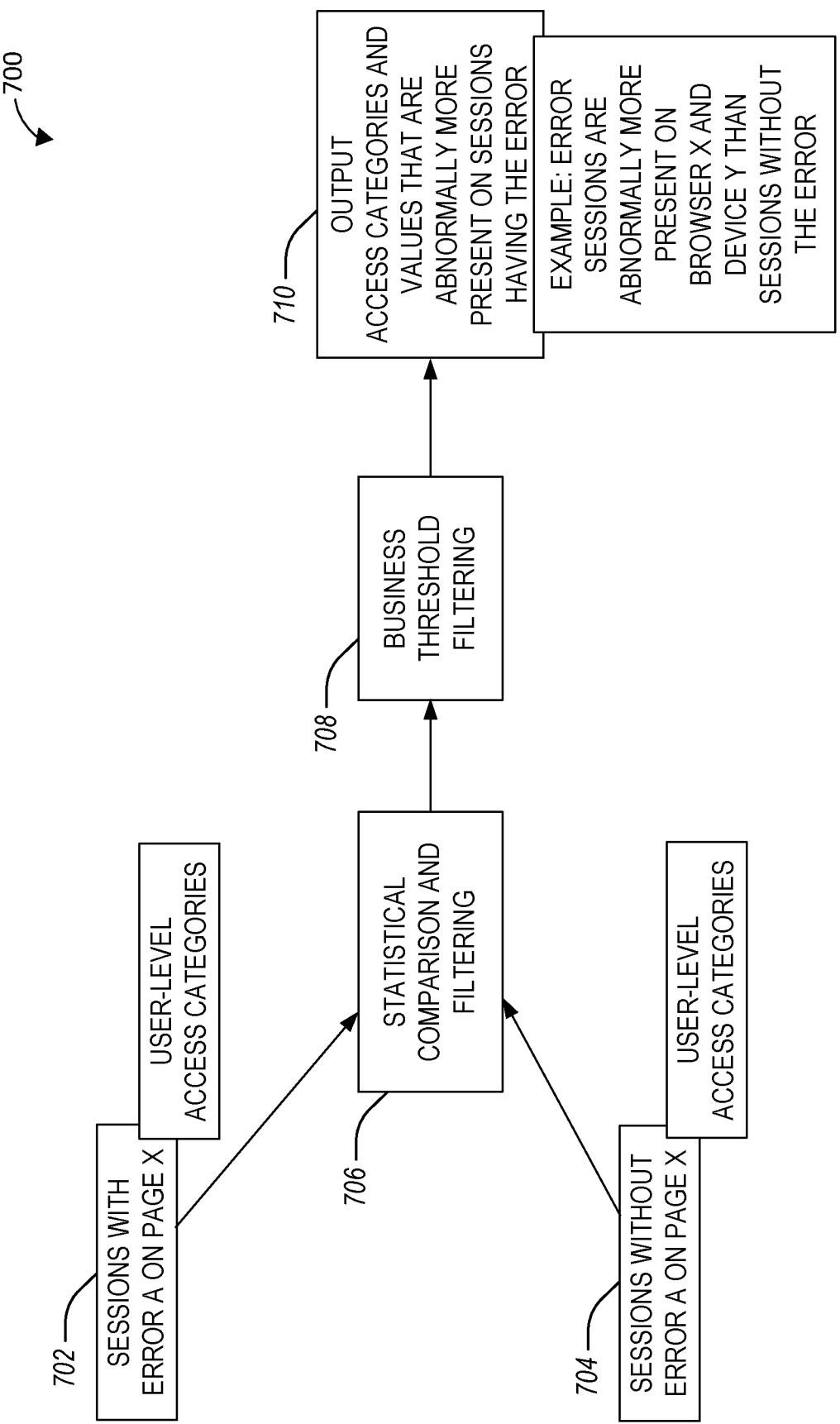
FIG. 7 is a block diagram showing a distribution comparison approach to website error detection, in accordance with some examples.

FIG. 7 is a block diagram 700 showing a distribution comparison approach to website error detection, in accordance with some examples. The block diagram 700 includes obtaining a first set of sessions with error A on page X at block 702. Retrieving the first set may include retrieving user-level access category information for the first set of sessions. The block diagram 700 includes obtaining a second set of sessions without error A on page X (e.g., over a similar or same time period as the first set of sessions). Retrieving the second set may include retrieving user-level access category information for the second set of sessions. The block diagram 700 includes a block 706 for statistical comparison and filtering of the first and second set of sessions. The block diagram 700 includes a block 708 for business threshold filtering. The block diagram 700 includes a block 710 for outputting an access category or value that is abnormally more present on sessions having the error (e.g., from the first set of sessions compared to the second set of sessions). For example, error sessions may be abnormally more present on sessions (e.g., from the second set of sessions) where browser X and device type Y (where browser and device type are access categories, and X and Y are the respective values) were used than sessions without the error (e.g., from the second set of sessions).

In an example, a goal in root cause analysis of website errors is to help owners or operators of a website understand if a given error is linked to some specific characteristics more quickly and efficiently. In an example, detecting a relevant characteristic of users encountering the error may be used to help a developer quickly understand how to reproduce the error and fix it.

In the root cause Analysis investigations described herein, user-level characteristics of access categories may be used. For example, an access category may include a device type, a browser, an operating system (OS), a traffic source, a new or returning user, a language, a country, or the like.

An access category may refer to the high level user characteristics described above, such as device, browser, etc. A value of an access category may be specific to the access category, such as for device type, desktop, mobile, tablet, etc. In some examples, an unknown or "other" value for an access category may be used. Examples of access category types may include:

For device type, one or more of desktop computer, laptop computer, tablet, mobile phone, internet of things (IoT) device (e.g., a smartwatch), for browser type, one or more of Firefox (provided by Mozilla), Safari (provided by Apple), Chrome (provided by Google), Opera (provided by Opera), Edge or Internet Explorer (both operated by Microsoft), for OS, one or more of Windows (provided by Microsoft), macOS (provided by Apple), Linux (open source), iOS (provided by Apple), Android (provided by various, including open source and Google), for traffic source, one or more of direct access of the web site (e.g., by entering, typing, copy/pasting, etc. a URL for the website into a browser), clicking from a link (e.g., an affiliate link, a search result link, an advertisement link, etc.), a redirect from another source, for new or returning user status, one or more of a logged in user, a user with cookies or other tracking information stored from a previous visit to a website, a user not logged in, a user that has no record of having accessed the web site (e.g., no cookie stored), for language, one or more of any language spoken or written, for country location, one or more of any country, nation, state, locality, province, or the like of the world, or may include an international or non-country specific value.

While contextless percentages may be used in some examples, they may not misrepresent the true nature of an error. For example, a given error A may appear to be linked to the browser Chrome when the majority of the users encountering the error were on Chrome. However, even if the sessions having the error A were at 80% on browser Chrome, if all traffic on a web site is actually around 80% on browser Chrome, independent of the error, Chrome may not be a root cause of the error. Instead, indicating that Chrome is related to the error would be incorrect, since the error A and the browser Chrome are not correlated due to the traffic being predominantly on Chrome.

The block diagram 700 of FIG. 7 shows a distribution comparison approach to error correlation, which corrects for this problem. To understand the root cause of an error, an evaluation of comparing distributions between sessions with a given error and sessions without the error may be used. The approach may detect characteristics that significantly differ between the two groups of sessions to determine that an error is abnormally more present on error sessions than non-error sessions.

To perform a comparison, sessions are compared with and without the error on the same page. This model of block diagram 700 provides an indication, for a particular error, a relevant access category (e.g., browser, device, etc.) and a relevant value for the relevant access category (e.g., Safari, desktop, etc.) that is abnormally more represented in the sessions having the error. More than one relevant value or relevant access category may be determined or output. For example, the error may be more likely to occur for desktop devices using Chrome.

Figure 8:
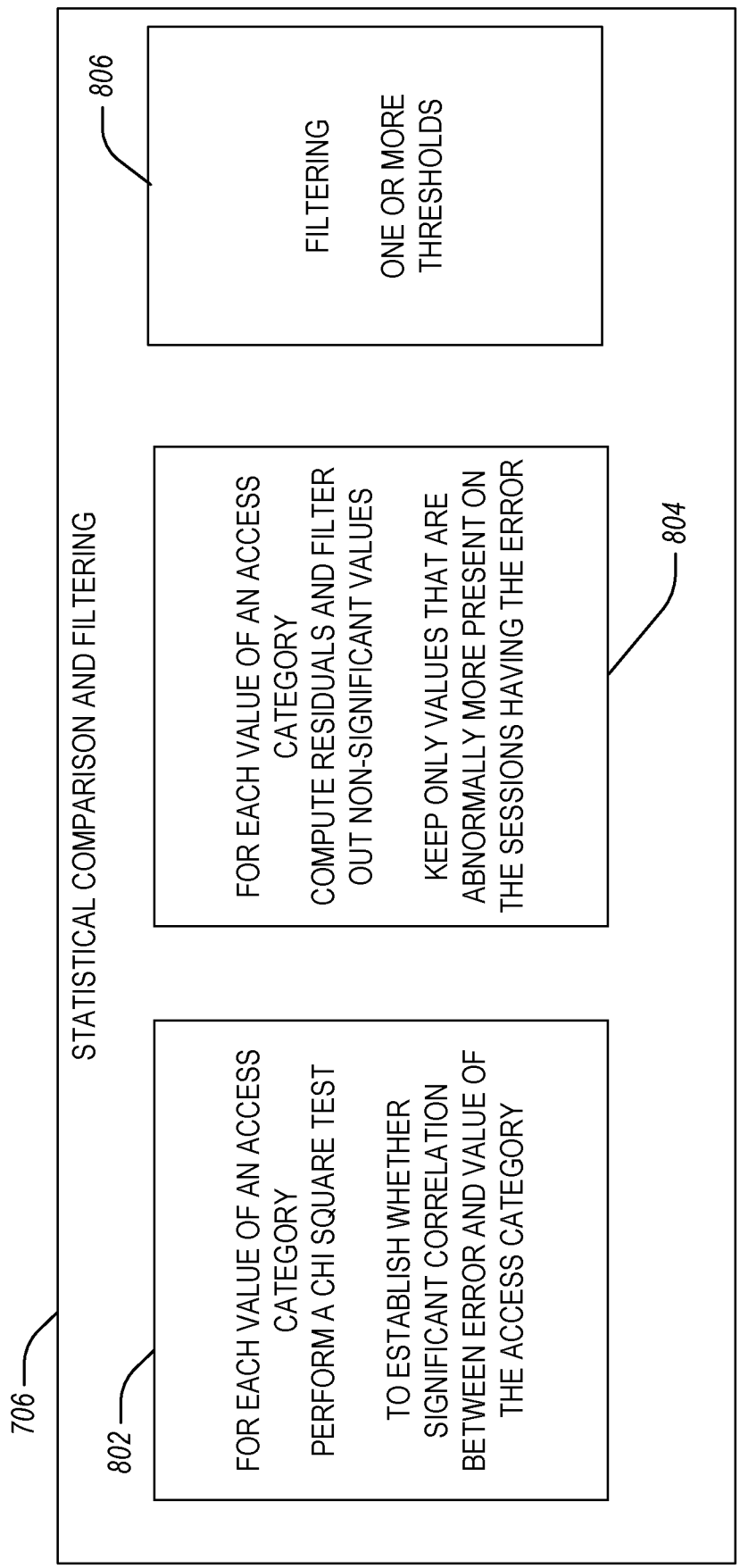
FIG. 8 is a block diagram showing statistical comparison and filtering for website error detection, in accordance with some examples.

FIG. 8 is a block diagram showing statistical comparison and filtering for website error detection, in accordance with some examples. FIG. 8 shows a more detailed view of block 706 from FIG. 7, including a chi square test at subblock 802 and a residuals and filter action at subblock 804.

The statistical comparison and filtering of block 706 may include only keeping access categories with a significant chi square value. The chi square test may be used to infer whether two or more categorical variables are significantly correlated, for example whether one has an impact on the other and vice versa.

In subblock 802, the chi square test may be used to compare a variable indicative of whether a session has an error, and the variable may have one of two values, yes the session has the error or no the session does not have the error. This variable comparison may be made for one or more access categories. The chi square test may be used to determine whether there is a relationship between a particular access category and having the error for respective sessions.

In an example, the chi square test uses a contingency table. For example, in the illustrative example in Table 1 below, which is not real data, a set of "observed" data for sessions with and without errors according to the access category of browser may include:

TABLE 1

|  | Chrome | Firefox | Safari | Total Row |
|---|---|---|---|---|
| Has the error | 170 (81%) | 30 (14%) | 10 (5%) | 210 |
| Does not have the error | 1000 (15%) | 1500 (23%) | 4000 (62%) | 6500 |
| Total Column | 1170 (17%) | 1530 (23%) | 4010 (60%) | 6710 |

In the above contingency table the numbers of sessions that fall in each category are provided, for example 170 sessions that had the error A and were on Chrome browser. The chi square test logic relies on comparing the actual distributions to the expected ones if there was no correlation between the variables.

In the example of Table 1, if there was no correlation at all between the two variables (error and access category browser), then since there are 17% of the total sessions on Chrome, this 17% in should appear in both groups of sessions having or not having the error. If this was the case it would indeed mean that being on a browser and having the error is not related at all (for the Chrome value of browser). For example, the expected data if there was no correlation between the variables appears in Table 2 below:

TABLE 2

|  | Chrome | Firefox | Safari | Total Row |
|---|---|---|---|---|
| Has the error | 37 (17%) | 48 (23%) | 125 (60%) | 210 |
| Does not have the error | 1133 (17%) | 1482 (23%) | 3885 (60%) | 6500 |
| Total Column | 1170 (17%) | 1530 (23%) | 4010 (60%) | 6710 |

By comparing the observed values of Table 1 with the expected values of Table 2, the result of a chi square test includes a value of 618.19, a relatively large value for a chi square test.

The resulting chi square test value may be compared, in some examples, to a confidence threshold (e.g., 90%, 95%, 99%, 99.9%, etc.). When the chi square test value is above the threshold, then there exists a significant relationship (e.g., with X % confidence) between having the error and being on a specific access category (e.g., here the browser access category). In the above example, this is indeed the conclusion of the test.

When there is a significant correlation (e.g., at 99% confidence), then the statistical comparison and filtering at block 706 may proceed to a next step, such as at subblock 804. When there is not a significant correlation (e.g., at 99% confidence), then the statistical comparison and filtering at block 706 may stop and conclude that there is no correlation between having the error and being on this specific access category. Other access categories may be considered at this point as well. If no access categories have a significant correlation, a result may be output indicating that there are no relevant access categories with a correlation to the error.

Knowing that an access category is relevant may be useful, but in some examples may not be sufficient for use in fixing the error. The following details allow for determining a value of the relevant access category that is correlated to the error (if any).

After conducting the chi square test at subblock 802, it is known that there is a relationship between having the error and the access category (e.g., the browser). However, it is still not known which value of the access category (e.g., chrome, safari, etc.) is abnormal. The chi square test is an omnibus test, which manes that the test that is able to tell that there is a relationship, but is not able to provide details about this relationship.

A next statistical step at subblock 804 may be used to determine which value of the access category is abnormal and potentially responsible for the significant relationship of the access category to the error. Subblock 804 may use a standardized residuals test. The residuals may include a measure of a difference between observed data and what is expected if there was no correlation. This difference may be standardized or normalized so that it may be compared between different access category values. In some examples, the bigger the residuals, the bigger the difference between values, and thus the more a particular value is abnormal.

Returning to the example discussed with respect to the chi square test, the residuals are computed and output as a contingency table of adjusted standardized residuals in Table 3 below:

TABLE 3

|  | Chrome | Firefox | Safari | Total Row |
|---|---|---|---|---|
| Has the error: | 170 (81%) | 30 (14%) | 10 (5%) | 210 |
| Adj Std Residuals: | 24.65 | −2.99 | −16.51 |  |
| Does not have the error: | 1000 (15%) | 1500 (23%) | 4000 (62%)% | 6500 |
| Adj Std Residuals: | −24.65 | 2.99 | 16.51 |  |
| Total Column | 1170 (17%) | 1530 (23%) | 4010 (60%) | 6710 |

In an example, consider the has the error line: when the residuals are above the 99% confidence threshold of 2.58 then the value may be considered statistically abnormal. In the example of Table 3, the Chrome browser is considered as being significantly more abnormal on sessions having the error, because 24.65 is greater than 2.58. In other examples, different confidence thresholds may be used (e.g., 90%, 95%, 99.9%, etc.) In an example, an indication may be output that identifies the Chrome browser as one that differs and is correlated to having the error.

Table 1 refers to the Observed Data while Table 2 refers to the Expected Data (if there was no correlation). In an example, Observed$_{i,j}$ corresponds to the cell on row i and column j of the Observed Data Table (Table 1), and Expected$_{i,j}$ corresponds to the cell on row i and column j of the Expected Data Table (Table 2). For example, Observed$_{1,1}$ corresponds to the value "Has the error" and "Chrome" which is "170" in Table 1. An Adjusted Standardized Residuals$_{i,j}$ formula may be given by Equation 1 below:

Where the Total Row Observed$_i$ corresponds to the total value of row i of Table 1, the Total Column Observed$_j$ corresponds to the total value of column j of Table 1, and the Total Observed corresponds to the grand total of the Table 1 (6710 in this example).

In an illustrative example, to compute the Adjusted Standardized Residuals$_{1,1}$ for the cell "Has the error" and "Chrome" (e.g., i=1 and j=1) here are the different values: Observed$_{1,1}$=170; Expected$_{1,1}$=37; Total Row Observed$_1$=210; Total Column Observed$_1$=1170; and Total Observed=6710.

In some examples, one or more other thresholds may be used, for example to ensure that the value of the access category is sufficiently correlated to the error. For example, while there may be a statistically significant correlation, the correlation may be minor in light of the volume of sessions, and may not be helpful in solving the error. A second determination may be used in consideration of sessions with the error.

In this second determination, first all significantly abnormal values of the access category under consideration may be kept (e.g., residuals above the 99% confidence threshold), while the non-abnormal values may be set aside. In the present example, the Chrome browser value sessions may be considered, while the Safari and Firefox browser value sessions may be set aside.

To illustrate the potential limitation of a significantly abnormal value that may not be helpful in correcting an error, consider a new set of constructed data in Table 4 below:

TABLE 4

|  | Chrome | Firefox | Safari | Total Row |
|---|---|---|---|---|
| Has the error | 1000 (18%) | 1200 (22%) | 3300 (60%) | 5500 |
| Does not have the error | 10000 (15%) | 15000 (23%) | 40000 (60%) | 65000 |
| Total Column | 11000 (16%) | 16200 (23%) | 43300 (61%) | 70500 |

In this constructed example, there is a difference of proportions of roughly 3% on Chrome between the sessions having the error and the sessions without the error. There is also a lot of traffic, and the chi square test results in an indication that there is a significant relationship between Chrome and the error. This is due to the larger amount of traffic, and the particular sensitivity of the chi square test to detect significance on small differences.

However, this 3% difference may not be useful for a developer in determining or fixing an error. While there may be a statically significant correlation between Chrome and the error, the distributions may not differ sufficiently to help solve the error. A further test beyond the statistical tests may be used to filter out these statistically significant but not useful results. In an example, a threshold may be used to ensure that in addition to statistical significance, an error-detection significance is present.

$$\frac{\text{Observed}_{i,j} - \text{Expected}_{i,j}}{\sqrt{\text{Expected}_{i,j} \times \left(1 - \frac{\text{Total Row Observed}_i}{\text{Total Observed}}\right) \times \left(1 - \frac{\text{Total Column Observed}_j}{\text{Total Observed}}\right)}} \qquad \text{Eq. 1}$$

The block 706 may include filtering at subblock 708. The filtering of subblock 708 may include using one or more error-detection significance thresholds. The number of thresholds or the value of a threshold may be selected according to user preference, in some examples. In other examples, a number or value of thresholds may be determined based on past performance (e.g., a threshold may be identified based on values that corresponded to helpful correlations for correcting an error).

An example first threshold is described below. The example first threshold may be applied to the values (e.g. Safari, Chrome, etc.) of an access category that were indicated to have statistical significance in the residuals test. The example threshold may include a difference of proportion between sessions having the error and sessions not having the error greater than a particular percentage (e.g., 5%, 10%, 20%, etc.). This threshold may be used to ensure that values with differences of proportions that are too small between the sessions having the error and the sessions without are discarded. For example, suppose that from the statistical checks of subblocks 802 and 804, it was determined that values of the browser access category including Chrome, Firefox, and Edge were significantly abnormal (see below, table 5).

To ensure that only useful differences in the proportions between the sessions having the error and the sessions without are used, any value with an absolute difference below 10% may not be sufficiently abnormal to be used. And so in this example the Edge value may be removed from the list of significantly abnormal sub-dimensions, while the Safari value was already removed in the chi square test or the residuals determination. See table 5 below:

TABLE 5

|  | % of sessions with error | % of sessions without error | Difference of proportion (absolute) |
| --- | --- | --- | --- |
| Chrome | 60% | 10% | +50% |
| Firefox | 30% | 4% | +26% |
| Edge | 5% | 1% | +4% |
| ~~Safari~~ | ~~5%~~ | ~~85%~~ | ~~−80%~~ |

In some examples, a second threshold may be used instead of or in addition to the threshold described above. The second threshold may include keeping identified relevant or statistically significant values only when at least one of them has a difference of proportion greater than a particular percentage (e.g., 25%, 30%, 35%, etc.). When all values have a difference of proportion lower than 30%, they may all be discarded. This second threshold may be used to ensure that at least one sub-dimension is largely different between the sessions having the error and the ones without. In the example above for table 5, because the Chrome value is above a threshold, for example 30%, both the Chrome and Firefox values may be kept. In different example below in table 6, none of the values are above 30%, so they are all discarded. Table 6:

TABLE 6

|  | % of sessions with error | % of sessions without error | Difference of proportion (absolute) |
| --- | --- | --- | --- |
| Chrome | 39% | 20% | +19% |
| Firefox | 30% | 19% | +11% |
| Edge | 1% | 1% | 0% |
| Safari | 30% | 60% | 30% |

In the example of table 6, both Chrome and Firefox values pass the first threshold described above, since as the difference of proportion for each is greater than 10%. However, none of the values has a difference of proportion greater than 30%, and so all of them may be discarded, with none considered as significantly abnormal.

In the example of table 6, there are more sessions on Chrome and Firefox in the sessions having the error, however this may be misleading because the error may not be actually correlated two browser values. As seen in table 6, 30% of sessions with the error occurred on Safari. In this example, indicating that Chrome and Firefox are correlated to the error may be counterproductive by having the developer not consider Safari session errors.

In some examples, a third threshold may be used instead of or in addition to one or more of the first or second threshold described above. The third threshold may include keeping identified relevant or statistically significant values only when the sum of proportions of sessions with errors in values that have statistical significance represents at least a particular percentage (e.g., 60%, 75%, 90%, etc.) of the total sessions with errors. This threshold may be used to ensure that the values considered abnormal represent a minimum amount of the total proportion of users. This may be useful in providing, with a high degree of confidence, that the output values are meaningful, and may be helpful in correcting the error.

Again considering the example of table 5 above, because the percent of sessions of Chrome and Firefox (and optionally Edge, depending on whether the first or second thresholds are used before or after the third threshold, or at all) add up to 90% (or 95%), they may be considered valid, since they exceed a threshold (e.g., 70%). Thus, an indication may be output informing a user that Chrome and Firefox values for the error sessions are significantly abnormal. In another example shown in table 7 below, the sum may be lower than a threshold (e.g. 75%), and thus not considered significantly abnormal (even if Chrome and Firefox were to pass the first and second threshold):

TABLE 7

|  | % of sessions with error | % of sessions without error | Difference of proportion (absolute) |
| --- | --- | --- | --- |
| Chrome | 50% | 20% | +30% |
| Firefox | 15% | 3% | +12% |
| Edge | 1% | 1% | 0% |
| Safari | 34% | 76% | −42% |

Here Chrome and Firefox values passed the first and the second thresholds as the difference of proportion is greater than 10% and at least one of them is above 30%. But since the sum of proportions is here equal to 65%, which is less than 75%, all values may be discarded.

User Interfaces

Figure 10:
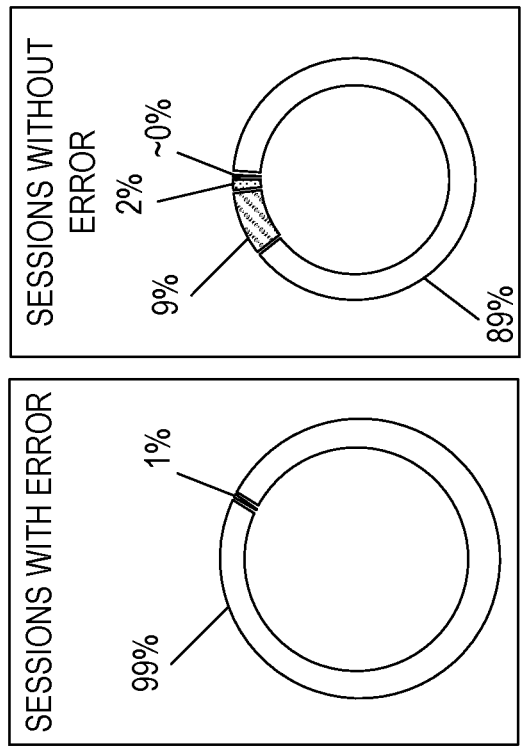

FIGS. 9-10 are example user interfaces for displaying website errors according to access categories, in accordance with some examples.

FIG. 9 illustrates an example user interface 902 for displaying results of errors and indications of corresponding significantly abnormal values of access categories. The user interface 902 includes an identifier (e.g., of an error, such as for searching, saving, indexing, etc.), an error level URL or other indicator of the website where the error occurred, a number of sessions with the error (e.g., for a user to reference), and relevant access control error values. The relevant access control error values are shown for each identifier where applicable. Some identifiers, such as 10 and 11 do not have any relevant access control error values, which may indicate that none of the values of any access control were relevant (e.g., none passed the chi square test, the residuals, or the one or more thresholds). Some identifiers, such as 0, 1, etc. have only a single relevant access control error value (e.g., desktop device type for identifier 0). Some identifiers, such as identifier 1 correspond to an "unknown" value. Some identifiers, such as identifier 2 or 9 have more than one relevant access control error value. Identifier 2 has two access control types, device and OS, as well as two values for OS, Mac OS X and Windows. Identifier 9 has three relevant access control error values, mobile device, search source, and Windows OS.

FIG. 10 illustrates an example user interface 1002 showing access control error values with abnormal distribution for a particular error. In some examples, user interface 1002 may be accessed by clicking on an aspect of the user interface 902 (e.g., on the row for an identifier). In some examples, user interface 902 and user interface 1002 may be presented as a single user interface, such as on a website.

The user interface 1002 shows error values for a particular error, which includes access control error values with abnormal distribution for the access control of device type. The access control error value with an abnormal distribution for the error shown in user interface 1002 is a desktop value for the device type. The desktop value was associated with 1146 sessions having the error, which was 99.22% of the total sessions with the error, and associated with only 0.06% of the sessions that did not have the error. The desktop value is thus highly correlated with the error, and after being subject to the chi square test, the residuals consideration, and one or more of the thresholds described above, the desktop value is indicated as being abnormally associated with the error. The user interface 1002 shows a table version and optional graphical versions of the information, with a graph showing sessions with the error, and sessions without the error.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

EXAMPLES

Example 1 is a method comprising: identifying an error corresponding to a website; retrieving a first set of user sessions where the error occurred; retrieving a second set of user sessions where the error did not occur; determining, for an access category, whether members of a set of values of the access category are correlated to the error, using the first set of user sessions and the second set of user sessions; comparing a characteristic of at least one member of the set of values that was determined to be correlated to the error to a threshold; and in response to comparison indicating that the at least one member of the set of values traversed the threshold, displaying an indication of the error and an indication of the at least one member of the set of values.

In Example 2, the subject matter of Example 1 includes, wherein the access category includes at least one of a device type, a browser type, an operating system, a traffic source, a new or returning user status, an access language, or a country location.

In Example 3, the subject matter of Examples 1-2 includes, wherein the threshold is one of a set of thresholds, and wherein displaying the indication of the at least one member of the set of values includes comparing one or more characteristics including the characteristic of the at least one member of the set of values to each threshold of the set of thresholds.

In Example 4, the subject matter of Examples 1-3 includes, wherein the characteristic corresponds to a difference of proportion between sessions in the first set of user sessions with the at least one member of the set of values and sessions in the second set of user sessions with the at least one member of the set of values.

In Example 5, the subject matter of Examples 1~4 includes, wherein the characteristic corresponds to a difference of proportion between sessions in the first set of user sessions for any respective member of the set of values and sessions in the second set of user sessions with the respective member of the set of values.

In Example 6, the subject matter of Examples 1-5 includes, wherein the determining whether members of the set of values of the access category are correlated to the error includes determining whether members of a second set of values of a second access category is correlated to the error; and wherein comparing the characteristic of the at least one member of the set of values that was determined to be correlated to the error to the threshold includes comparing a second characteristic of a second member of the second set of values that was determined to be correlated to the error to the threshold; and wherein displaying the indication of the error and the indication of the at least one member of the set of values includes displaying the indication of the second member of the second set of values.

In Example 7, the subject matter of Examples 1-6 includes, wherein the comparison includes using a chi squared analysis.

In Example 8, the subject matter of Examples 1-7 includes, wherein the comparison includes using residuals of the set of values.

In Example 9, the subject matter of Examples 1-8 includes, displaying a graph of all correlated members that traversed the threshold.

In Example 10, the subject matter of Examples 1-9 includes, wherein the access category includes a device type, and wherein the set of values for the device type include desktop computer, mobile computer, tablet, and unknown.

Example 11 is at least one machine readable medium including instructions, which when executed by processing circuitry, cause the processing circuitry to perform operations to: Identify an error corresponding to a website; retrieve a first set of user sessions where the error occurred; retrieve a second set of user sessions where the error did not occur; determine, for an access category, whether members of a set of values of the access category are correlated to the error, using the first set of user sessions and the second set of user sessions; compare a characteristic of at least one member of the set of values that was determined to be correlated to the error to a threshold; and in response to comparison indicating that the at least one member of the set of values traversed the threshold, display an indication of the error and an indication of the at least one member of the set of values.

In Example 12, the subject matter of Example 11 includes, wherein the access category includes at least one of a device type, a browser type, an operating system, a traffic source, a new or returning user status, an access language, or a country location.

In Example 13, the subject matter of Examples 11-12 includes, wherein the threshold is one of a set of thresholds, and wherein displaying the indication of the at least one member of the set of values includes comparing one or more characteristics including the characteristic of the at least one member of the set of values to each threshold of the set of thresholds.

In Example 14, the subject matter of Examples 11-13 includes, wherein the characteristic corresponds to a difference of proportion between sessions in the first set of user sessions with the at least one member of the set of values and sessions in the second set of user sessions with the at least one member of the set of values.

In Example 15, the subject matter of Examples 11-14 includes, wherein the characteristic corresponds to a difference of proportion between sessions in the first set of user sessions for any respective member of the set of values and sessions in the second set of user sessions with the respective member of the set of values.

In Example 16, the subject matter of Examples 11-15 includes, wherein to determining whether members of the set of values of the access category are correlated to the error includes to determine whether members of a second set of values of a second access category is correlated to the error; and wherein to compare the characteristic of the at least one member of the set of values that was determined to be correlated to the error to the threshold includes to compare a second characteristic of a second member of the second set of values that was determined to be correlated to the error to the threshold; and wherein to display the indication of the error and the indication of the at least one member of the set of values includes to display the indication of the second member of the second set of values.

In Example 17, the subject matter of Examples 11-16 includes, wherein the comparison includes using a chi squared analysis.

In Example 18, the subject matter of Examples 11-17 includes, wherein the comparison includes using residuals of the set of values.

In Example 19, the subject matter of Examples 11-18 includes, wherein the instructions further cause the processing circuitry to display a graph of all correlated members that traversed the threshold.

In Example 20, the subject matter of Examples 11-19 includes, wherein the access category includes a device type, and wherein the set of values for the device type include desktop computer, mobile computer, tablet, and unknown.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method comprising:
identifying, from users accessing a website, an error by analyzing data related to the website, the error corresponding to an in-page issue of the website;
retrieving, from the data, a first set of user sessions where the error occurred;
retrieving, from the data, a second set of user sessions where the error did not occur;
determining, for an access category, whether members of a set of values of the access category are correlated to the error, using the first set of user sessions and the second set of user sessions;
comparing one or more characteristics including a characteristic of at least one member of the set of values that was determined to be correlated to the error to each threshold of a set of thresholds including a threshold; and
in response to the comparison indicating that the characteristic of the at least one member of the set of values traversed the threshold, displaying an indication of the error and an indication of the at least one member of the set of values.

2. The method of claim, 1 wherein the access category includes at least one of a device type, a browser type, an operating system, a traffic source, a new or returning user status, an access language, or a country location.

3. The method of claim 1, wherein the characteristic corresponds to a difference of proportion between sessions in the first set of user sessions with the at least one member of the set of values and sessions in the second set of user sessions with the at least one member of the set of values.

4. The method of claim 1, wherein the characteristic corresponds to a difference of proportion between sessions in the first set of user sessions for any respective member of the set of values and sessions in the second set of user sessions with the respective member of the set of values.

5. The method of claim 1, wherein the determining whether members of the set of values of the access category are correlated to the error includes determining whether members of a second set of values of a second access category is correlated to the error; and wherein comparing the characteristic of the at least one member of the set of values that was determined to be correlated to the error to the threshold includes comparing a second characteristic of a second member of the second set of values that was determined to be correlated to the error to the threshold; and wherein displaying the indication of the error and the indication of the at least one member of the set of values includes displaying the indication of the second member of the second set of values.

6. The method of claim 1, wherein the comparison includes using a chi squared analysis.

7. The method of claim 1, wherein the comparison includes using residuals of the set of values.

8. The method of claim 1, further comprising displaying a graph of all correlated members that traversed the threshold.

9. The method of claim 1, wherein the access category includes a device type, and wherein the set of values for the device type include desktop computer, mobile computer, tablet, and unknown.

10. At least one non-transitory machine readable medium including instructions, which when executed by processing circuitry, cause the processing circuitry to perform operations to:
identify, from users accessing a website, an error by analyzing data related to the website, the error corresponding to an in-page issue of the website;
retrieve, from the data, a first set of user sessions where the error occurred;
retrieve, from the data, a second set of user sessions where the error did not occur;
determine, for an access category, whether members of a set of values of the access category are correlated to the error, using the first set of user sessions and the second set of user sessions;
compare one or more characteristics including a characteristic of at least one member of the set of values that was determined to be correlated to the error to each threshold of a set of thresholds including a threshold; and
in response to the comparison indicating that the characteristic of the at least one member of the set of values traversed the threshold, display an indication of the error and an indication of the at least one member of the set of values.

11. The at least one machine readable medium of claim 10, wherein the access category includes at least one of a device type, a browser type, an operating system, a traffic source, a new or returning user status, an access language, or a country location.

12. The at least one machine readable medium of claim 10, wherein the characteristic corresponds to a difference of proportion between sessions in the first set of user sessions with the at least one member of the set of values and sessions in the second set of user sessions with the at least one member of the set of values.

13. The at least one machine readable medium of claim 10, wherein the characteristic corresponds to a difference of proportion between sessions in the first set of user sessions for any respective member of the set of values and sessions in the second set of user sessions with the respective member of the set of values.

14. The at least one machine readable medium of claim 10, wherein to determining whether members of the set of values of the access category are correlated to the error includes to determine whether members of a second set of values of a second access category is correlated to the error; and wherein to compare the characteristic of the at least one member of the set of values that was determined to be correlated to the error to the threshold includes to compare a second characteristic of a second member of the second set of values that was determined to be correlated to the error to the threshold; and wherein to display the indication of the error and the indication of the at least one member of the set of values includes to display the indication of the second member of the second set of values.

15. The at least one machine readable medium of claim 10, wherein the comparison includes using a chi squared analysis.

16. The at least one machine readable medium of claim 10, wherein the comparison includes using residuals of the set of values.

17. The at least one machine readable medium of claim 10, wherein the instructions further cause the processing circuitry to display a graph of all correlated members that traversed the threshold.

18. The at least one machine readable medium of claim 10, wherein the access category includes a device type, and wherein the set of values for the device type include desktop computer, mobile computer, tablet, and unknown.

* * * * *